(12) United States Patent
Isaacs

(10) Patent No.: US 7,670,143 B2
(45) Date of Patent: Mar. 2, 2010

(54) MODEL FOR DEMONSTRATING PATHOLOGICAL PHYSIOLOGICAL CONDITIONS

(75) Inventor: Judah Isaacs, Oceanside, NY (US)

(73) Assignee: Innovative Premiums, Inc., Oceanside, NY (US)

( * ) Notice: Subject to any disclaimer, the term of this patent is extended or adjusted under 35 U.S.C. 154(b) by 1037 days.

(21) Appl. No.: 11/332,615

(22) Filed: Jan. 13, 2006

(65) Prior Publication Data

US 2006/0154229 A1 Jul. 13, 2006

Related U.S. Application Data

(60) Provisional application No. 60/643,685, filed on Jan. 13, 2005.

(51) Int. Cl.
G09B 23/28 (2006.01)
(52) U.S. Cl. .................. 434/262; 434/365
(58) Field of Classification Search ........... 434/262, 434/263, 267–269, 272, 268, 366, 369, 370, 434/404, 405, 365; 40/491, 493; 401/192, 401/195
See application file for complete search history.

(56) References Cited

U.S. PATENT DOCUMENTS

| 2,742,114 | A | * | 4/1956 | Behlen | 52/262 |
|---|---|---|---|---|---|
| 3,343,292 | A | * | 9/1967 | Jørgensen | 40/334 |
| 3,531,885 | A | * | 10/1970 | Dablo | 40/335 |
| 3,688,008 | A | * | 8/1972 | Krieger, Sr. | 434/268 |
| 4,381,615 | A | * | 5/1983 | Lonsmin | 40/334 |
| 4,768,960 | A | * | 9/1988 | Pan | 434/269 |
| 5,411,437 | A | * | 5/1995 | Weber et al. | 434/269 |
| 5,505,623 | A | * | 4/1996 | Chernack et al. | 434/272 |
| 5,557,867 | A | * | 9/1996 | Sugawara | 40/493 |
| 5,727,949 | A | * | 3/1998 | Bar-Or et al. | 434/267 |
| 5,743,730 | A | * | 4/1998 | Clester et al. | 433/26 |
| 5,908,302 | A | * | 6/1999 | Goldfarb | 434/262 |
| 6,171,005 | B1 | * | 1/2001 | Kuo | 401/195 |
| 6,241,095 | B1 | * | 6/2001 | Yencheng | 206/459.1 |
| 6,375,376 | B1 | * | 4/2002 | Hsu | 401/247 |
| 6,386,780 | B1 | * | 5/2002 | Brummernhenrich | 401/192 |
| 6,742,953 | B2 | * | 6/2004 | Burden et al. | 401/194 |
| 7,284,986 | B2 | * | 10/2007 | Winnike et al. | 434/267 |

* cited by examiner

Primary Examiner—Kurt Fernstrom
(74) Attorney, Agent, or Firm—Katten Muchin Rosenman LLP

(57) ABSTRACT

A model for demonstrating a physiological condition of a part of a being includes a chamber with a transparent wall, and first and second components located in the chamber and configured to represent the part of the being and a substance capable of affecting the normal condition of the being's part, respectively. The components interact with one another to demonstrate the physiological condition of the organ caused by the substance during displacement of the model.

16 Claims, 2 Drawing Sheets

MODEL FOR DEMONSTRATING PATHOLOGICAL PHYSIOLOGICAL CONDITIONS

CROSS-REFERENCE TO RELATED APPLICATION

This application claims priority to Provisional Application Ser. No. 60/643,685 filed with the U.S. Patent and Trademark Office on Jan. 13, 2005 and fully incorporated herein.

BACKGROUND OF THE INVENTION

1. Field of the Invention

This invention relates to a model for demonstrating pathological physiological conditions.

2. Background

Cholesterol is a soft, fat-like, waxy substance found in the bloodstream and in all body cells. Cholesterol is produced in the liver and is an important part of a healthy body used for producing cell membranes and hormones and serves other needed bodily functions. However, too high a level of cholesterol in the blood, known as hypercholesterolemia, is a major risk for coronary heart disease, which leads to heart attack. It is also a risk factor for stroke.

Cholesterol is found in a human body for the following two reasons. First, as mentioned above, the liver produces it. Second, cholesterol is contained in animal products, such as meats, poultry, fish, eggs, butter, cheese and whole milk. In addition, some foods that do not contain animal products may contain trans-fats, which cause the body to make more cholesterol. Furthermore, foods with saturated fats also cause the body to make more cholesterol.

Cholesterol and other fats cannot dissolve in the blood. When a body too much cholesterol or too much is absorbed from foods, it is deposited in our arteries as plaque. Thus, to protect our arteries, the plaque should be transported to and from the cells.

Two kinds of special carriers of cholesterol called lipoproteins fulfill this mission. One, low-density lipoprotein or LDL, is known as the "bad" cholesterol. Too much LDL cholesterol can clog the arteries, increasing the risk of heart attack and stroke. High-density lipoprotein, or HDL, is known as the "good" cholesterol. It carries cholesterol away from the arteries.

Studies suggest that high levels of HDL cholesterol reduce the risk of heart attack. According to current estimates, 64.4 million people in America have one or more forms of cardiovascular disease (CVD). These diseases claimed 931,108 lives in 2001 (about 39 percent of all deaths). Almost 150,000 of all people killed by CVD are under age 65.

Coronary heart disease is caused by arteriosclerosis—the thickening or hardening of the coronary arteries. This condition is likely to produce angina pectoris, heart attack or both. Coronary heart disease caused 502,189 deaths in 2001 and is the single leading cause of death in America today. At least 13.2 million people alive today have a history of heart attack, angina pectoris (chest pain) or both.

Thus, it is not surprising that millions and millions of people both healthy and suffering from coronary decease visit physicians on a regular basis. Typically, a medical consultation is associated with a sketchy demonstration briefly explaining the reasons and consequences of this decease. Many patients, particularly healthy ones, tend to forget the information received during a visit to a medical office immediately upon leaving it. However, peoples' awareness may be critically improved, if the demonstration of the reasons and consequences of bad cholesterol by a physician was more vivid, and if there was an item useful in everyday life and capable of reminding people of "bad cholesterol."

Clearly, clogging the arteries is not the only medical problem that can and should be demonstrated in medical offices. For example, an item or model demonstrating dental problems, granulation occurred in different body organs, ulcers and the like may be a helpful and effective tool for heightening our awareness of these problems.

A need, thus, exists for a demonstration model illustrating a cholesterol plaque built-up occurring in blood vessels and clogging those vessels to constrict blood flow.

Still a further need exists for demonstration models each illustrating respective particular physiological conditions and having a practical application in an everyday life.

Still a further need exists for manufacturing an item having utility in an everyday life and configured to demonstrate pathological physiological conditions during the use of this item.

SUMMARY OF THE INVENTION

The present invention is directed to an apparatus that satisfies these needs. The invention includes an item, such as a pen or pencil, for demonstrating pathological physiological conditions associated, for example, with clogging the arteries. The inventive pen can, thus, be used as a regular writing instrument capable of reminding the user about the danger of "bad" cholesterol during the use of the pen.

In case of a pen, it may be configured as either a Fountain or Rollerball pen and include a substantially elongated housing having a distal portion, which houses a writing mechanism, and a proximal portion, which has at least one part made from transparent material. The transparent part is configured to demonstrate physiological conditions typically associated with clogged arteries. To emulate the real pathological condition, the transparent part houses a component, which is fixed inside this portion, and a displaceable component floating within the transparent portion, when the pen is displaced between generally vertical and horizontal positions. The outer side of the fixed components is provided with a colored pattern representing the wall of the artery. Thus, the transparent part is designed to demonstrate a blood vessel having its inner surface provided with the excessive amount of plaque, which extends inwards and inhibits flow of the displaceable component that represents blood flow.

Preferably, the distal portion of the inventive pen is cylindrical and made from glass or transparent plastic. The plaque can be manufactured from rubber, plastic or any other easily shaped material that can be fixed within the chamber defined by the inner wall of the transparent portion. A plurality of small particles suspended in fluid, which fills the chamber, emulates blood flow. A colored pattern illustrating the wall of the artery may be provided either on the outer side of the fixed component or imprinted on a region of the inner surface of the transparent portion.

In use, when the pen is held by the user in a plane transverse to a substantially horizontal plane, the red particles tend to float along the chamber under gravity and encounter protrusions of the fixed part, which, thus, leads to inhibit blood flow. Displacing the pen in a substantially horizontal position will force the particles to move in the opposite direction.

DETAILED DESCRIPTION

Figure 1:
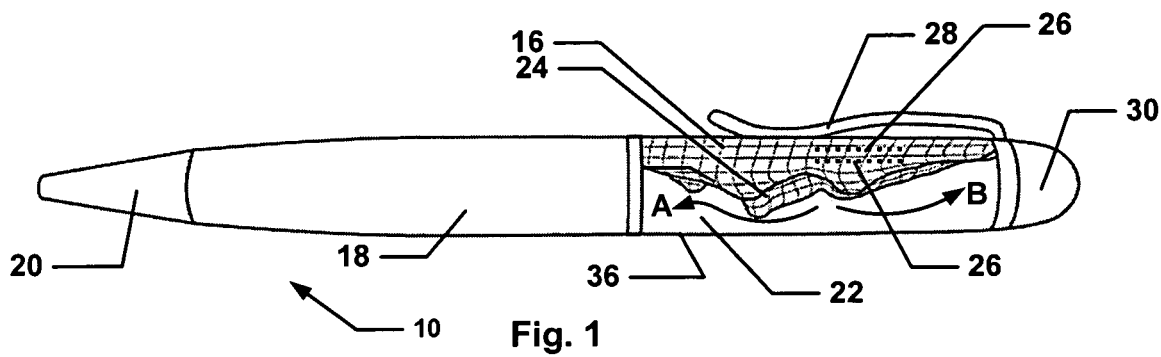
FIG. 1 is an elevation side view of a pen configured in accordance with the present invention.

Reference will now be made in detail to several views of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Referring more particularly to FIGS. 1-5, a model 10 is configured as a pencil or pen operative to demonstrate the cholesterol plaque built-up typically observed in blood vessels which may include the arteries of human beings and some animals. Model 10 has an elongated housing extending between front and rear ends 12, 14, respectively (FIGS. 3-5) and structured to display the above-mentioned physiological condition. The body includes a proximal portion 16 and a distal portion 18 (FIG. 1). These portions may be fixed to or detachably coupled to one another.

The proximal portion 16 is made from transparent material, such as plastic or glass, and configured as a display for demonstrating a blood vessel, which is affected by the cholesterol plaque built-up. Having generally a cylindrical shape, proximal portion 16 is provided with in inner wall 36 (FIG. 1) defining a chamber, which is filled with a liquid that may be, but not limited to, water. A displaceable component 26, which is diagrammatically shown in FIGS. 1 and 3, includes a plurality of small red-painted particles 26 made, among other materials, from rubber or plastic and suspended in liquid to represent a blood stream. Note that particles 26 are illustrated as parallel rows, but, of course, the shape of the blood stream always changes deviating from the shown pattern as particles 26 move upon displacing model 10 between generally vertical and horizontal positions.

Figure 3:
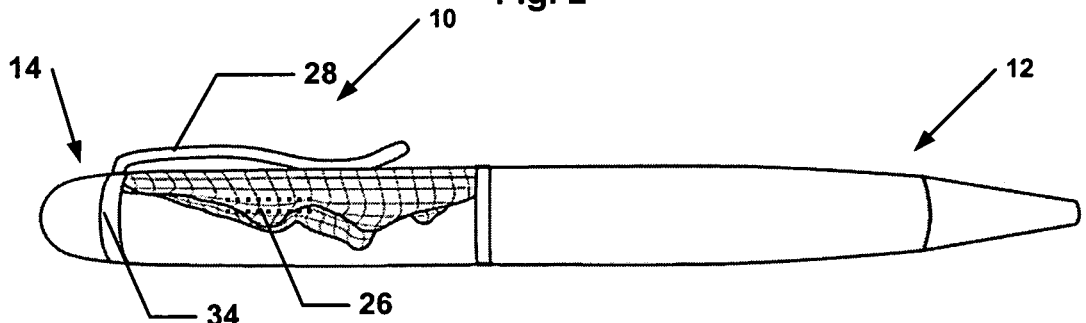
FIG. 3 is an elevation view of the side opposite to the one shown in FIG. 1.

The cholesterol built-up plaque is represented by a component 22 (FIG. 1) fixedly mounted within proximal portion 16 and made from rubber or similar material, which is preferably white. Component 22 occupies only a part of the chamber and defines a passage between its inner surface and the opposing segment of the vessel's inner wall 36. Typically, formation of the cholesterol plaque is characterized by a non-uniform penetration of the plaque towards the center of the vessel. Accordingly, as shown in FIGS. 1, 3, the inner side of component 22 is formed with one or spaced protrusions or ridges 24 configured uniformly or non-uniformly and, thus, terminating at uniform or various distance from the opposing segment of inner wall 36 so as to inhibit the flow of particles 26.

As mentioned before, proximal portion 16 represents a blood vessel. To complete the demonstration of the physiological conditions associated with the cholesterol plaque built-up, the outer wall of the vessel is represented by a pattern 40 (FIG. 2) imprinted either on the inner or outer wall of proximal portion 16. Alternatively, the outer side of fixed components 22 may be provided with such a pattern. Preferably, the pattern has a pinkish hue corresponding to natural colors of the vessel's wall.

Figure 4:
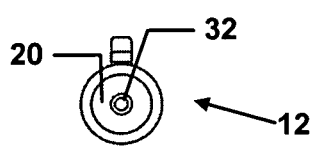
FIG. 4 is an elevation front view of the inventive pen.
Figure 5:
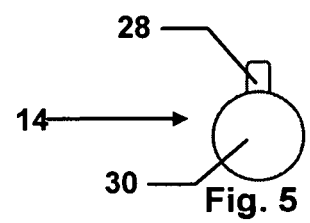
FIG. 5 is an elevation rear view of the inventive pen.

The distal portion 18 is shaped and dimensioned to house a writing mechanism including an ink tube 32 (FIG. 4). Depending on a particular configuration of model 10, it can have a conventional ballpoint pen or fountain pen writing mechanism, as well as all known modifications thereof. As shown in the FIGS. 1 and 2, distal portion 18 is rotatably coupled to a tip 20. Rotation of tip 20 and distal portion 18 relative to one another causes ink tube 32 (FIG. 4) either to protrude through the opening of tip 20 or withdraw depending on the sense of rotation. The ink tube 32 can be replaceable. Alternatively, the entire structure may be used as long as the installed ink tube contains ink and then, upon running out of ink, model 10 can be disposed.

Note that the structure of model 10 is not limited to rotation causing ink tube 32 to move between the rest and operating positions. One of possible modifications of the pen structured model 10 may allow distal and proximal portions 18, 16, respectively, to move linearly towards one another upon overcoming a spring force of a spring-loaded actuator located within the model. The spring-loaded actuator displaces ink tube 32 either to an operating extended position or a withdrawn rest position every time the user applies a force capable of displacing distal and proximal portions 18, 16, respectively, towards one another.

Rear end 14 (FIG. 3) of model 10 includes a cap 30 (FIG. 1) coupled to proximal portion 16 either fixedly or detachably. The cap 30 and proximal portion 16 define a groove therebetween, which is shaped and dimensioned to receive a ring 34 (FIG. 3) coupled to a clip 28.

A variety of materials can be used for manufacturing model 10. Preferably, tip 20 and clip 28 are made from metal, whereas distal portion 18, proximal portion 16, and cap 30 all are made from plastic. Model 10 is ergonomically designed to occupy a minimal space and allow the user to comfortably grip the pen.

In use, when model 10 is displaced from a generally horizontal position to an inclined position, particles 26 start moving either in the direction of arrow A or B (FIG. 1) imitating, thus, blood flow. As movable particles 26 encounter ridges 24 of fixed component 22, the particles are forced to deviate from a linear path to flow along a passage having narrow regions defined between ridges 24 and the opposing segment of inner wall 36. The larger ridges 24, the more inhibited blood flow. Thus, the user of model 10 can clearly see the effect of the cholesterol plaque built-up.

Figure 2:
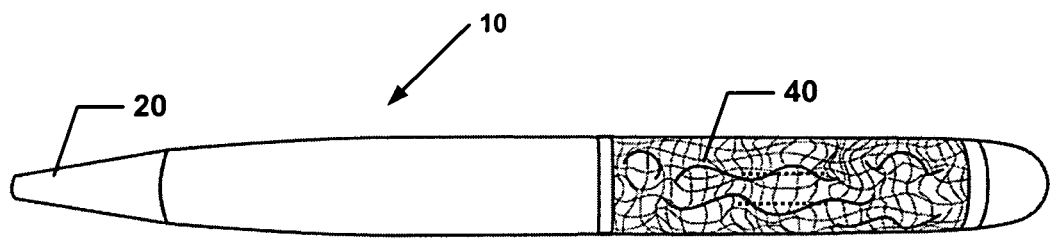
FIG. 2 is a top view of the inventive pen.
Figure 8:
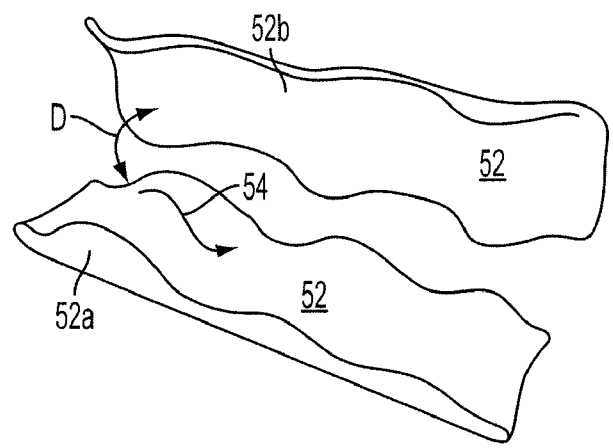
FIG. 8 is an opened detail of demonstration components of the inventive pen.

In a further embodiment, a model 10a includes a clip 28, a cap 30 and a proximal portion 50 which is made from transparent material. Proximal portion 50 (FIG. 6) is adapted for a user's hand and is configured to relay visual information regarding a medical condition, such as cholesterol plaque build-up. Thereto, portion 50 may be a blood vessel and may be suitably imprinted with a vessel wall pattern 40 (FIG. 2). Two or more components 52, demonstrating plaque build-up (FIG. 8 opened relative to each other along arrow D), are disposed in proximal portion 50 to create a channel 54 that demonstrates the irregular and partially obstructed flow (arrow C) of displaceable components 26 moving in liquid medium. Displaceable components 26 may demonstrate blood cells and may be suitably red in color. A fluid medium is provided proximal portion 50 and is generally clear for maximum viewability of other features.

Each component 52 includes one or more smooth sides 52a for insertion or mounting in proximal portion 50 against a wall of portion 50 and an irregular side 52b showing disposition, accumulation, roughing, etc. due to a medical condition. Preferably, each of the plurality of components 52 have sides 52b that are different from each other. Further, it is preferred if irregularities 56 of different components 52 are spaced to demonstrate constriction 58 of channel 54 by their cooperation. Irregularities 56 also preferably are located with respect to each other or with respect to a plurality of component 56 to create wide channel portions 60.

The concept of this invention is not limited to the above-disclosed model showing the mechanism of the cholesterol built-up plaque. Practically, any patho-physiological condition of human and animal organisms may be illustrated by the inventive model provided certain changes, which represent a particular organ and physiological condition, are made to the inventive model.

For example, the scope of the present invention may encompass a model demonstrating the formation of blood clot or thrombosis. Anyone who is off his or her feet due to illness, injury or surgery is at risk of developing a blood clot deep inside the leg. This condition is called a deep vein thrombosis or DVT. The clot may break loose, travel to the lungs through the inferior vina cava, right atrium and into the pulmonary artery, and cause an immediate death.

The transparent proximal portion of model 10, when slightly modified, may define, for example, a passage including the deep vein, which runs into the inferior cava and the heart. A mass of plastic or rubber may represent a clot suspended inside the proximal portion. In a substantially horizontal position of model 10, the clot is located close to the rear end of portion 16, which corresponds to the deep vein. Displacing model 10 to a substantially vertical position will force the clot to move towards the front end of portion 16 and pass through the inferior cave, heart and into the pulmonary artery (not shown). This model may also be provided with a so-called Greenfield Filter located upstream from heart in the inferior cava and serving as an effective remedy against further penetration of the clot by simply catching it. Such a model will be particularly helpful for surgeons during the explanation about the danger of the clot and the mechanism of surgery preventing this danger. The mass representing the clot may be made from rubber or plastic particles. The wall of the vessels may be imprinted on the inner or outer wall of portion 16 or the vessels may be formed as the fixed component made from transparent material and having the appropriate anatomical shape.

The model 10 may also be configured as a toothbrush having a transparent portion, which is made from plastic or glass. A plastic component representing a tooth may be fixed to the bottom of the transparent portion so that a small space is formed between the exterior of the tooth and the inner wall of the transparent portion. As is explained above, the transparent portion is a chamber filled with fluid, which allows suspended particles, which represent plaque, to float back and forth during displacement of the toothbrush between horizontal and vertical positions. As the toothbrush is displaced, the particles move through the small space and accumulate to cover at least a part of the tooth's contour to demonstrate an effect of a plaque built-up.

Another example may relate to osteoporosis and include a single or multiple vertebras fixed in the proximal portion of model 10 and shown to be fractured. Currently, one of the most effective procedures, which is called vertebraplasty, deals with this problem by cementing fragmented vertebra. Accordingly, model 10 may have fixed components illustrating at least one fractured vertebra, whereas movable rubber or plastic particles may represent a cementing medium. Displacing model 10 will force movable the particles to fill in the fracture so that the vertebra is restored to its normal dimensions.

Other examples may include formation of granulations in kidneys and uterus. Again, the fixed component may be shaped to represent any of these organs, whereas the movable particles may descend to and accumulate in the fixed component illustrating a gradual built-up leading to the formation of stones. Obviously, any known depositions in other canals and vessels of a human body can be illustrated similarly to the above-disclosed model.

Yet a further example may relate to peptic ulcers in the stomach walls. The wall may be represented by the appropriately shaped fixed component of model 10. This component may include at least one perforation traversed by gastric juice represented by the movable component of model 10.

Figure 6:
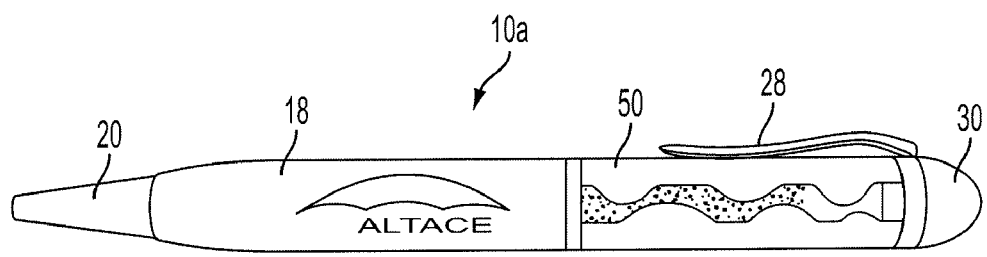
FIG. 6 is an elevation side view of a pen of a further embodiment configured in accordance with the present invention.
Figure 7:
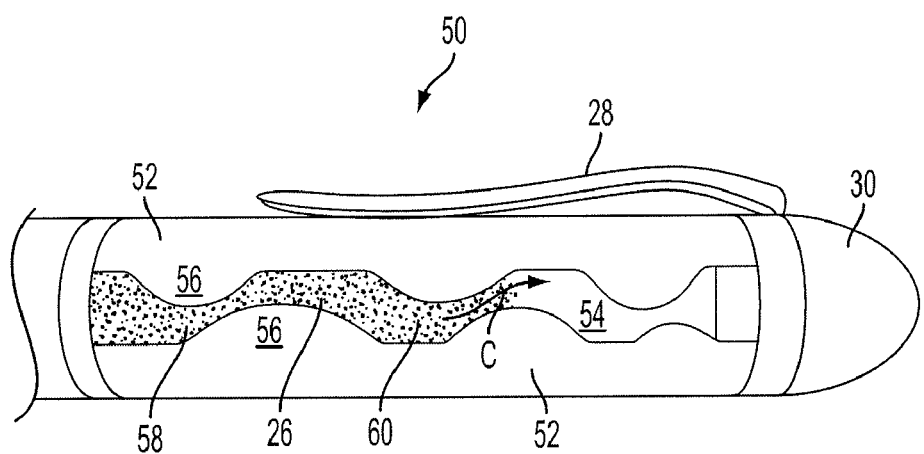
FIG. 7 is a detail elevation view of the inventive pen.

In a further embodiment, each of the parts of the pen may be suitably imprinted, embossed, or marked to convey a message, explanation or advertisement, such as the one in FIG. 6. Such a message may preferably be related to the physiological condition.

The invention is not limited to the disclosed examples or particular use of the inventive model. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded by the invention as recited in the following claims.

What is claimed is:

1. A model for demonstrating a physiological condition, the model comprising:
  a housing having a transparent part configured to represent the physiological condition; and
  a component mounted in the transparent part and configured to demonstrate the physiological condition, the housing being displaceable between first and at least one second positions thereof so as to demonstrate an effect of the physiological, condition wherein the transparent part of the housing is configured as a vessel, and the component is configured as a build-up in the vessel so as to demonstrate the physiological condition, the component being coupled to an inner wall of the transparent part and having an inner surface inwardly extending from the inner wall of the transparent part.

2. The model of claim 1, wherein the housing has a proximal portion provided with the transparent part and a distal portion, the proximal and distal portions being detachably or fixedly coupled to one another.

3. The model of claim 2, wherein the coupled distal and proximal portions of the housing define one of a pen and a pencil, the distal portion housing a writing mechanism.

4. The model of claim 3, further comprising a clip coupled to the proximal portion of the housing, the pen comprising one of a fountain pen and a rollerball pen.

5. The model of claim 1, further comprising a plurality of separate colored particles configured to represent a flow in the transparent part of the housing, the plurality of colored particles being movable along a passage of the transparent part defined between the inner surface of the component and an opposing segment of the inner wall of the transparent part while the housing being displaced between the fist and at least one second positions.

6. The model of claim 5, wherein the inner surface of the component has one or more ridges inhibiting displacement of the colored particles in the transparent part of the hosing so as to demonstrate the effect of the built-up.

7. The model of claim 6, wherein the ridges are uniformly or non-uniformly shaped and dimensioned.

8. The model of claim 5, further comprising a fluid filling the transparent part of the housing and having a specific density allowing the plurality of colored particles to flow in the fluid during displacement of the housing.

9. The model of claim 8, wherein the fluid is colorless or having a color different from the colored particles.

10. The model of claim 9, wherein the fluid is water, the plurality of particles each and the component being made from rubber or plastic, the component being colored differently from the plurality of particles.

11. The model of claim 1, further comprising a graphic pattern provided on one of the inner wall of the proximal portion, the outer wall thereof or an outer surface of the component and having a hue to correspond to natural colors of the vessel.

12. The model of claim 1, wherein said vessel is a blood vessel and said build-up is a cholesterol plaque build-up.

13. A model for demonstrating a physiological condition of a predetermined part of a being, the model comprising:
a housing having a transparent part and displaceable between a plurality of positions;
a plurality of components located in the transparent part and configured to represent the predetermined part of the being and a substance capable of pathologically affecting the predetermined part of the being, respectively, the components interacting with one another to demonstrate an effect of the pathological condition of the predetermined part of the being during displacement of the housing between the plurality positions, and
wherein a first component of the plurality of components is a graphic pattern provided on an inner or outer surface of the transparent part and configured to represent a wall of the predetermined part of the being, the predetermined part of the being being configured as a vessel, the vessel being filled with a fluid, a second component of the plurality of components being configured to represent a build-up and attached to the inner surface of the transparent part of the housing.

14. The model of claim 13, further comprising a third component including a plurality of colored particles floating in the fluid during displacement of the housing between the multiple positions of the housing so as to demonstrate a flow, the second component having an inner surface provided with one or multiple ridges, the ridge encountering the colored particles so as to inhibit the flow thereof, thereby demonstrating the pathological condition of the vessel.

15. The model of claim 14, further comprising a writing mechanism mounted in the housing, wherein the housing being shaped and dimensioned to be one of a pen and a pencil.

16. The model of claim 13, wherein said vessel is a blood vessel and said build-up is a cholesterol plaque build-up.

* * * * *